(12) United States Patent
Bendlin et al.

(10) Patent No.: US 12,035,356 B2
(45) Date of Patent: Jul. 9, 2024

(54) MOBILE BROADBAND AND MACHINE TYPE COMMUNICATION NETWORK COEXISTENCE

(71) Applicant: AT&T Intellectual Property I, L.P., Atlanta, GA (US)

(72) Inventors: Ralf Bendlin, Cedar Park, TX (US); Ye Chen, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 304 days.

(21) Appl. No.: 17/453,455

(22) Filed: Nov. 3, 2021

(65) Prior Publication Data
US 2023/0134170 A1    May 4, 2023

(51) Int. Cl.
| | |
|---|---|
| *H04W 72/566* | (2023.01) |
| *H04L 1/00* | (2006.01) |
| *H04L 5/00* | (2006.01) |
| *H04W 4/70* | (2018.01) |
| *H04W 48/02* | (2009.01) |
| *H04W 72/23* | (2023.01) |

(52) U.S. Cl.
CPC ......... *H04W 72/569* (2023.01); *H04L 1/0013* (2013.01); *H04L 5/0048* (2013.01); *H04W 4/70* (2018.02); *H04W 48/02* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 10,798,706 B1 * | 10/2020 | Raghunathan | ...... H04W 56/002 |
| 10,848,283 B2 * | 11/2020 | Xue | ........................ H04L 5/005 |

(Continued)

FOREIGN PATENT DOCUMENTS

| | | | | |
|---|---|---|---|---|
| CN | 107046721 A | * | 8/2017 | ........... H04L 5/0012 |
| CN | 107734561 A | * | 2/2018 | ............... H04B 1/44 |

(Continued)

OTHER PUBLICATIONS

"3GPP—Release 13," https://www.3gpp.org/release-13, accessed Nov. 3, 2021, 2 pages.

(Continued)

*Primary Examiner* — Andrew C Oh

(57) ABSTRACT

Techniques for mobile broadband and machine type communication network coexistence are provided. A method can include embedding, by a system comprising a processor, narrowband carriers, comprising a first narrowband carrier having a first bandwidth and a second narrowband carrier having the first bandwidth, into respective portions of an enhanced wireless broadband carrier, the enhanced wireless broadband carrier having a second bandwidth that is greater than the first bandwidth; transmitting, by the system to network equipment via the first narrowband carrier, a master information block comprising a first bandwidth field indicative of the first bandwidth and a second bandwidth field, distinct from the first bandwidth field, indicative of the second bandwidth; and scheduling, by the system, the network equipment on the second narrowband carrier in response to transmitting the master information block to the network equipment.

20 Claims, 10 Drawing Sheets

(56) References Cited

U.S. PATENT DOCUMENTS

| | | | |
|---|---|---|---|
| 2013/0039299 A1* | 2/2013 | Papasakellariou | H04L 5/0048 370/329 |
| 2014/0314041 A1* | 10/2014 | Kim | H04L 5/0048 370/329 |
| 2015/0229493 A1* | 8/2015 | Lee | H04L 25/0234 370/252 |
| 2017/0187488 A1* | 6/2017 | Rico Alvarino | H04L 1/0059 |
| 2017/0238292 A1* | 8/2017 | Rico Alvarino | B65D 88/32 370/329 |
| 2017/0311250 A1* | 10/2017 | Rico Alvarino | H04W 48/18 |
| 2018/0054821 A1* | 2/2018 | Sun | H04W 72/0453 |
| 2018/0160427 A1* | 6/2018 | Ravishankar | H04B 7/18539 |
| 2018/0249511 A1* | 8/2018 | Rathonyi | H04W 74/006 |
| 2018/0262975 A1* | 9/2018 | Martinez Tarradell | H04W 56/001 |
| 2018/0270771 A1* | 9/2018 | Chendamarai Kannan | H04L 27/2675 |
| 2019/0150151 A1* | 5/2019 | Nader | H04W 4/70 370/329 |
| 2019/0319764 A1* | 10/2019 | Nader | H04W 72/0453 |
| 2019/0364521 A1* | 11/2019 | Axmon | H04W 72/0446 |
| 2019/0372696 A1* | 12/2019 | Park | H04B 7/26 |
| 2020/0022168 A1* | 1/2020 | Xu | H04L 5/0053 |
| 2020/0163032 A1* | 5/2020 | Su | H04W 48/12 |
| 2020/0404622 A1* | 12/2020 | Fliess | H04L 1/0059 |
| 2021/0226760 A1* | 7/2021 | Ye | H04L 5/0007 |
| 2021/0281371 A1* | 9/2021 | Wei | H04L 1/1614 |
| 2021/0289470 A1* | 9/2021 | Kumar | H04J 11/0076 |
| 2021/0297984 A1* | 9/2021 | Höglund | H04W 68/02 |
| 2022/0131594 A1* | 4/2022 | Shrestha | H04W 36/04 |
| 2022/0338171 A1* | 10/2022 | Marupaduga | H04W 72/02 |
| 2023/0134170 A1* | 5/2023 | Bendlin | H04L 1/0013 370/329 |

FOREIGN PATENT DOCUMENTS

| | | | | |
|---|---|---|---|---|
| CN | 110140382 A | * | 8/2019 | H04B 1/713 |
| CN | 110475361 A | * | 11/2019 | H04W 48/10 |
| CN | 112715015 A | * | 4/2021 | H04L 1/0027 |
| CN | 114175848 A | * | 3/2022 | H04W 4/70 |
| EP | 3342081 B1 | * | 9/2021 | H04B 7/0456 |
| WO | WO-2017058096 A2 | * | 4/2017 | H04J 11/0066 |
| WO | WO-2017134626 A1 | * | 8/2017 | H04L 5/0007 |
| WO | WO-2017136000 A1 | * | 8/2017 | H04L 1/0041 |
| WO | WO-2018143864 A1 | * | 8/2018 | |
| WO | WO-2018174614 A1 | * | 9/2018 | H04J 11/00 |
| WO | WO-2018175813 A1 | * | 9/2018 | H04L 27/2613 |
| WO | WO-2018201968 A1 | * | 11/2018 | |
| WO | WO-2019032978 A1 | * | 2/2019 | H04L 1/0011 |
| WO | WO-2019070187 A1 | * | 4/2019 | H04L 1/08 |
| WO | WO-2020060203 A1 | * | 3/2020 | H04B 1/713 |

OTHER PUBLICATIONS

"3GPP—Release 15," https://www.3gpp.org/release-15, accessed Nov. 3, 2021, 3 pages.

"LTE; Evolved Universal Terrestrial Radio Access (E-UTRA); Radio Resource Control (RRC); Protocol specification," 3GPP TS 36.331 version 16.1.1 Release 16, 1083 pages.

* cited by examiner

MOBILE BROADBAND AND MACHINE TYPE COMMUNICATION NETWORK COEXISTENCE

TECHNICAL FIELD

The present disclosure relates to wireless communication networks, and, in particular, to techniques for facilitating coexistence between mobile broadband and machine type communication networks.

BACKGROUND

Advancements in mobility network technology have enabled support for an increasing number of devices as well as an increasing variety of device types. One such advancement is Enhanced Machine Type Communications (eMTC), which is a low-power wide-area (LPWA) network technology that can be utilized by Internet of Things (IoT) devices such as smart electrical meters or the like. By utilizing reduced bandwidth compared to a typical mobile broadband (MBB) network (e.g., 1.4 MHz compared to 20 MHz for an MBB network), an eMTC network can facilitate communication between devices with lower cost, complexity, and/or power consumption.

DETAILED DESCRIPTION

Figure 1:
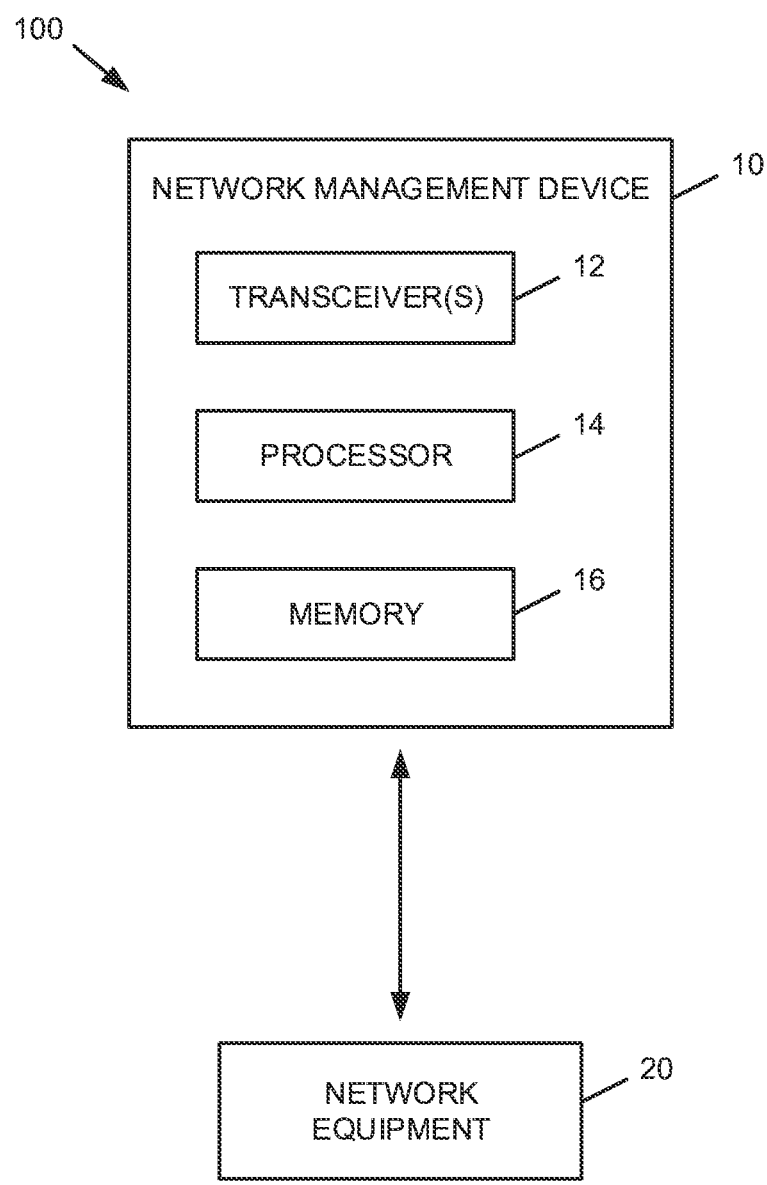
FIG. 1 is a block diagram of a system that facilitates mobile broadband and machine type communication network coexistence in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include embedding, by a system including a processor, narrowband carriers, including a first narrowband carrier and a second narrowband carrier both having a first bandwidth, into respective portions of an enhanced wireless broadband carrier, the enhanced wireless broadband carrier having a second bandwidth that is greater than the first bandwidth. The method can further include transmitting, by the system to network equipment via the first narrowband carrier, a master information block that includes a first bandwidth field indicative of the first bandwidth and a second bandwidth field, distinct from the first bandwidth field, indicative of the second bandwidth. The method can also include scheduling, by the system, the network equipment on the second narrowband carrier in response to transmitting the master information block to the network equipment.

In another aspect, a system as described herein can include a processor and a memory that stores executable instructions that, when executed by the processor, facilitate performance of operations. The operations can include embedding narrowband carriers, including a first narrowband carrier and a second narrowband carrier, of a first bandwidth into respective portions of an enhanced wireless broadband carrier, the enhanced wireless broadband carrier having a second bandwidth that is greater than the first bandwidth; transmitting, to user equipment via the first narrowband carrier, a master information block including a first bandwidth field indicative of the first bandwidth and a second bandwidth field, distinct from the first bandwidth field, indicative of the second bandwidth; and allocating communication resources associated with the second narrowband carrier to the user equipment in response to transmitting the master information block to the user equipment.

In a further aspect, a non-transitory machine-readable medium as described herein can include executable instructions that, when executed by a processor, facilitate performance of operations. The operations can include embedding a group of carrier bands, including a first carrier band and a second carrier band, having a first bandwidth into respective portions of an enhanced wireless broadband carrier band, the enhanced wireless broadband carrier band having a second bandwidth that is greater than the first bandwidth; transmitting, to a network device via the first carrier band, a master information block including a first bandwidth field that indicates the first bandwidth and a second bandwidth field, distinct from the first bandwidth field, that indicates the second bandwidth; and scheduling communication resources associated with the second carrier band to the network device in response to transmitting the master information block to the network device.

Referring first to FIG. 1, a system 100 that facilitates mobile broadband (MBB) and machine type communication (MTC) network coexistence is illustrated. System 100 as shown by FIG. 1 includes a network management device 10 that can communicate with network equipment 20, e.g., one or more mobile devices and/or any other device(s) configured for operation in a wireless communication system. In an aspect, the network management device 10 can be implemented by a base station, an access point, an evolved Node B (eNB) or next generation Node B (gNB), and/or any other device that provides communication service to the network equipment 20. Also or alternatively, the network management device 10 can be implemented wholly or in part by one or more network controllers and/or other devices that manage communication between devices of one or more underlying wireless communication networks. The network management device 10, when implemented in this manner, can reside on the same communication network as the network equipment 20 or on a different network (e.g., such that the controller can communicate with respective network devices via a separate system). Other implementations of the network management device 10 are also possible.

In an aspect, the network equipment 20 can include any suitable device(s) that can communicate over a wireless communication network associated with the network management device 10. Such devices can include, but are not limited to, cellular phones, computing devices such as tablet or laptop computers, autonomous vehicles, Internet of Things (IoT) devices, etc. Also or alternatively, network equipment 20 could include a device such as a modem, a mobile hotspot, or the like, that provides network connectivity to another device (e.g., a laptop or desktop computer, etc.), which itself can be fixed or mobile. As another example, network equipment 20 could include bandwidth-reduced, low complexity (BL) devices and/or devices in coverage enhancement (CE), which are referred to herein as BL/CE devices. BL/CE devices can include, for example, smart meters with cellular connectivity that are associated with a smart power grid, internet of things (IoT) devices, and/or any other low-complexity devices with cellular communication functionality.

Collectively, the network management device 10 and the network equipment 20 can form at least a portion of a wireless communication network. While only one network management device 10 and one network equipment 20 are illustrated in FIG. 1 for simplicity of illustration, it is noted that a wireless communication network can include any amount of network equipment 20 and/or other devices, such as the network management device 10, base stations, etc.

As additionally described herein, the network management device 10 can facilitate coexistence between multiple communication networks, such as an Enhanced MBB (eMBB) network and an Enhanced MTC (eMTC) network, using a common set of physical communication resources. For example, as will be discussed in further detail below with respect to FIGS. 2-3, the network management device 10 can facilitate the embedding of respective narrowband carriers associated with a first network (e.g., an eMTC network) into a wideband carrier associated with a second, distinct network (e.g., an eMBB network). In an aspect, respective communication networks managed by the network management device 10 can be utilized by the same and/or different network equipment 20. By way of example, the network management device 10 can manage a bandwidth-limited network that facilitates communication between BL/CE devices as well as a broadband network that facilitates communication between mobile phones and/or other wideband-capable devices. Other network configurations are also possible.

The network management device 10 shown in system 100 can include one or more transceivers 12 that can communicate with (e.g., transmit messages to and/or receive messages from) the network equipment 20 and/or other devices in system 100. The transceiver 12 can include respective antennas and/or any other hardware or software components (e.g., an encoder/decoder, modulator/demodulator, etc.) that can be utilized to process signals for transmission and/or reception by the network management device 10 and/or associated network devices such as a base station.

The network management device 10 can further include a processor 14 and a memory 16, which can be utilized to facilitate various functions of the network management device 10. For instance, the memory 16 can include a non-transitory computer readable medium that contains computer executable instructions, and the processor 14 can execute instructions stored by the memory 16. For simplicity of explanation, various actions that can be performed via the processor 14 and the memory 16 of the network management device 10 are shown and described below with respect to various logical components. In an aspect, the components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable.

In an aspect, the processor 14 and memory 16 of the network management device 10 can be utilized to facilitate improved coexistence between a MTC network, such as a network utilizing eMTC, and a broadband network, such as a Fifth Generation (5G) New Radio (NR) eMBB network. While various implementations are described herein in the context of an eMTC network and an eMBB network, it is noted that these implementations are presented merely as non-limiting examples and that other network technologies could also be used without departing from the subject matter described herein.

Figure 2:
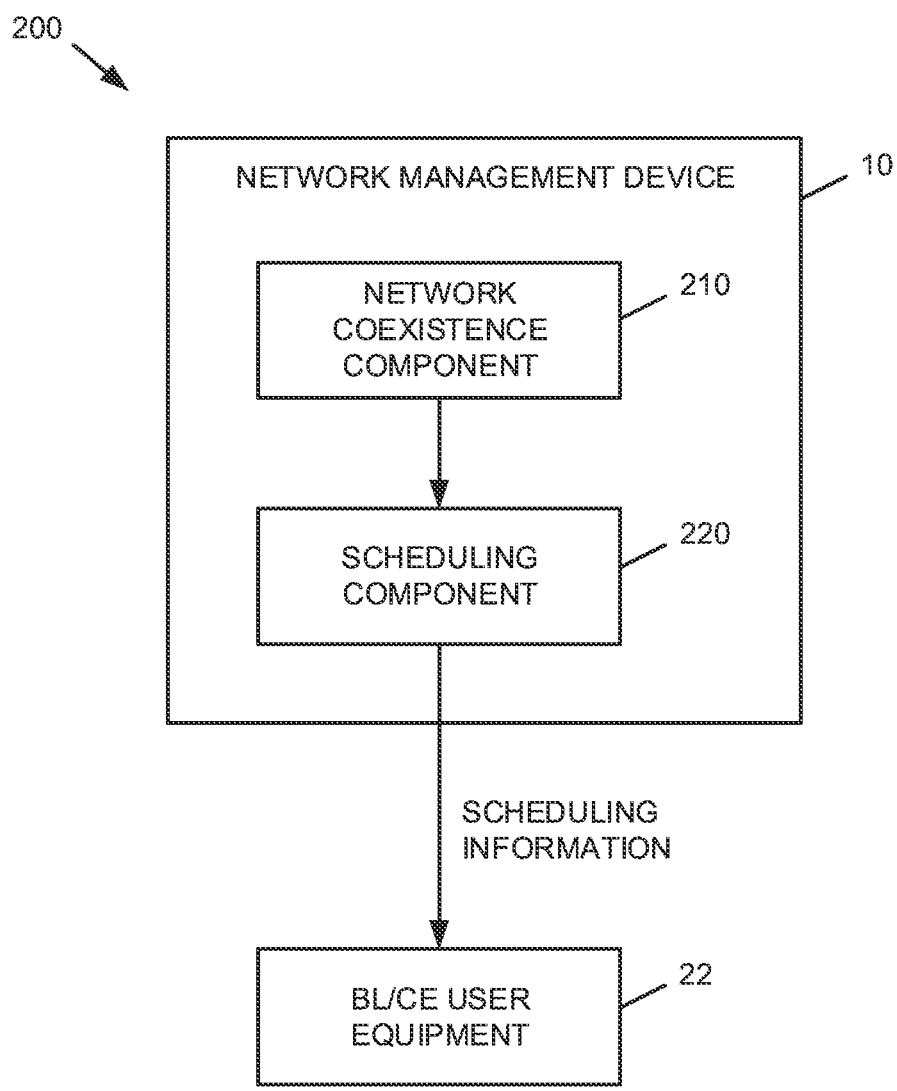
FIG. 2 is a block diagram that depicts the functionality of the network management device of FIG. 1 in further detail in accordance with various aspects described herein.

With reference now to FIG. 2, a block diagram of a system 200 that facilitates MBB and MTC network coexistence is illustrated. Repetitive description of like elements employed in other embodiments described herein is omitted for sake of brevity. System 200 as shown in FIG. 2 includes a network management device 10 that can operate in a similar manner to that described above with respect to FIG. 1. As further shown in FIG. 2, the network management device 10 can communicate with Bandwidth reduced Low latency (BL) user equipment (UEs), e.g., Internet of Things (IoT) devices, smart meters with cellular connectivity in a smart power grid, or the like, and/or UEs in Coverage Enhancement (CE), e.g., devices that are configured with coverage that is greater than that of a standard UE due to the devices being fixed within indoor areas such as cellars or garages where standard coverage would not provide sufficient connectivity. As used herein, these UEs are referred to as BL/CE UEs 22.

In an aspect, the network management device 10 can communicate with the BL/CE UEs 22 via eMTC, which is a Third Generation Partnership Project (3GPP) Long Term Evolution (LTE) technology for Low Power Wide Area (LPWA) communications. A feature of eMTC is that it utilizes reduced bandwidth (e.g., 1.4 MHz) compared to MBB LTE, which supports communication at bandwidths of up to 20 MHz. This reduction in bandwidth results in lower cost, complexity, and power consumption, which makes eMTC suitable for massive machine type communications, e.g., communications by the BL/CE UEs 22 as described above.

While devices operating in an eMTC network utilize a reduced bandwidth of 1.4 MHz, the network management device 10 can embed the corresponding 1.4 MHz eMTC carrier into a larger wideband carrier, e.g., a MBB carrier. When embedded into an LTE carrier, an eMTC carrier can leverage information associated with the LTE carrier to facilitate device scheduling. For instance, since the LTE primary synchronization signal (PSS) and secondary synchronization signal (SSS), as well as the LTE Physical Broadcast Channel (PBCH) are limited to 1.4 MHz to facilitate configuration of cells with potentially varying bandwidths, LTE MBB and LTE eMTC can share a common PSS, SSS, and/or PBCH. An example of a common signaling structure that can be utilized for LTE MBB and LTE eMTC is described in further detail below with respect to FIG. 4.

As a result of the common signaling present in an LTE system, devices operating according to eMTC in an LTE system can obtain information relating to the bandwidth of the LTE MBB carrier in which the corresponding eMTC carrier is embedded via the common PBCH. This can, in turn, enable more efficient use of the MBB carrier for eMTC devices, e.g., as described in further detail below. While eMTC can be embedded into other, non-LTE carriers, such as wideband Enhanced MBB (eMBB) carriers based on the Fifth Generation (5G) New Radio (NR) interface, non-LTE wideband carriers may not share common signals and/or channels such as the common PSS, SSS, and/or PBCH as noted above. As a result, eMTC UEs operating in a non-LTE network are not informed of the carrier bandwidth into which they are embedded. Additionally, because of the lack of shared information in non-LTE systems, a 1.4 MHz eMTC carrier embedded into a wideband LTE MBB carrier and a 1.4 MHz eMTC carrier embedded into a wideband RN eMBB carrier or other non-LTE carrier can operate fundamentally differently, such that the eMTC carrier embedded into the non-LTE carrier will perform less efficiently.

To the foregoing and/or related ends, the network management device 10 of system 200 can operate as described below to enable a 1.4 MHz eMTC carrier (and/or other suitable narrowband carrier) embedded into a generic wideband carrier, such as a wideband eMBB NR carrier, to operate in a similar manner to a 1.4 MHz eMTC carrier embedded into a wideband MBB LTE carrier. Accordingly, the network management device 10 can increase the performance of eMTC embedded in non-LTE carriers, such as a standalone 5G NR carrier, in terms of throughput, latency, area capacity, number of eMTC users served, and/or other metrics. As wireless communication networks are expected to transition from LTE to 5G NR in the future, these and/or other advantages can be utilized to maintain and/or improve the performance of a wireless communication network as the technology associated with the network continues to advance. Additionally, since LTE eMTC and LTE MBB share the same PSS, SSS, and PBCH signaling, the network management device 10 can additionally ensure that eMTC bandwidth signaling in the LTE PBCH is performed in a manner that does not degrade the performance of legacy LTE UEs.

As shown in FIG. 2, the network management device 10 of system 200 can include a network coexistence component 210 that can embed narrowband carriers, such as eMTC carriers, into respective portions of a wideband carrier, such as an eMBB carrier. As used herein, the term "embedding" refers to allocating and/or otherwise assigning physical resources, represented by Orthogonal Frequency Division Multiplexing (OFDM) tones, physical resource blocks (PRBs), or the like, to multiple distinct carrier bands. Thus, the network coexistence component 210 can embed a narrowband carrier into a wideband carrier by assigning PRBs or other resources associated with the wideband carrier to the narrowband carrier in addition to the wideband carrier. The act of embedding a carrier band is described in further detail below with respect to FIG. 3. In an aspect, the narrowband carriers embedded by the network coexistence component 210 can be of a first bandwidth, and the wideband carrier into which the narrowband carriers are embedded can be of a second bandwidth that is greater than the first bandwidth.

The network management device shown in FIG. 2 further includes a scheduling component 220 that can transmit, to network equipment such as the BL/CE UEs 22, a master information block (MIB) that includes a first bandwidth field indicative of the bandwidth of the narrowband carriers embedded by the network coexistence component 210 as well as a second, distinct bandwidth field indicative of the bandwidth of the wideband carrier into which the narrowband carriers are embedded. Based on the bandwidth information as included in the bandwidth fields of the MIB, the scheduling component 220 can also schedule, and/or otherwise allocate resources to, a BL/CE UE 22 on an embedded narrowband carrier.

Figure 3:
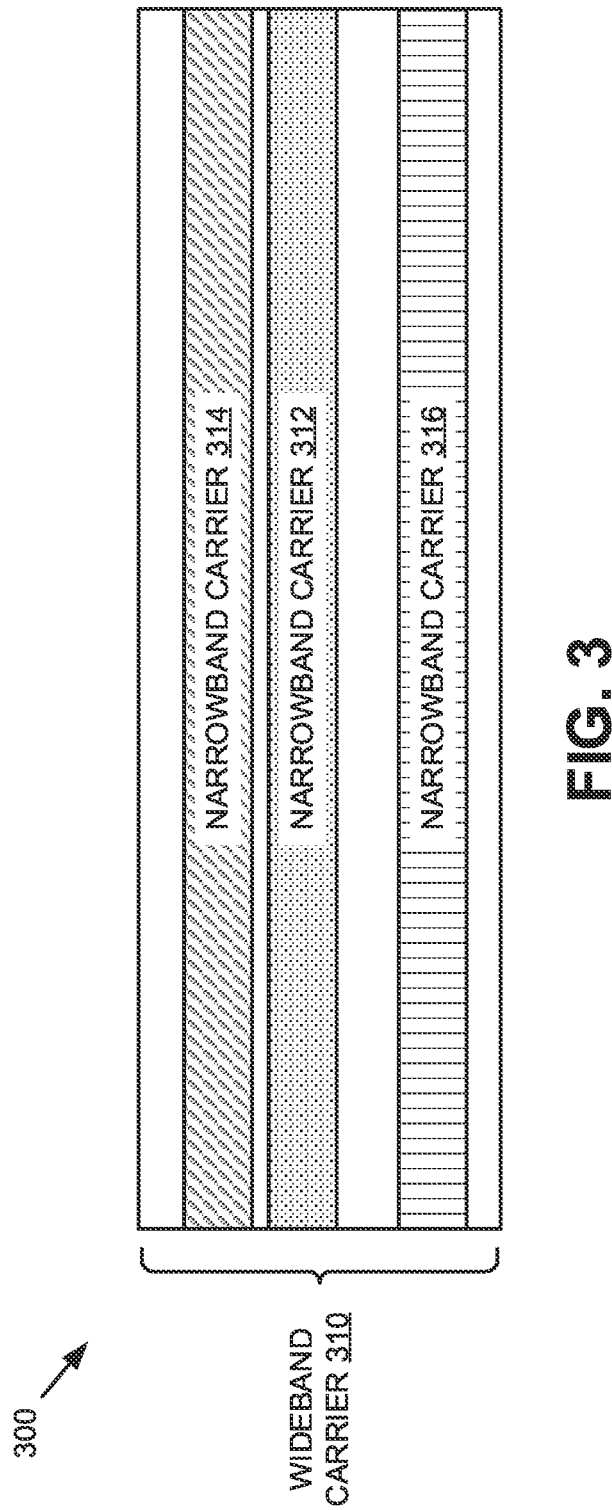
FIG. 3 is a diagram that depicts example narrowband carriers that can be embedded into a wideband carrier, e.g., by the network management device of FIG. 1, in accordance with various aspects described herein.

A visual example of carrier bands that can be embedded by the network coexistence component is shown by diagram 300 in FIG. 3. As shown by diagram 300, a wideband carrier 310 (e.g., a carrier band associated with a NR eMBB network) can be configured such that respective narrowband carriers 312, 314, 316 (e.g., carrier bands associated with an LTE eMTC network) are allocated within the wideband carrier 310. In an aspect, a first narrowband carrier 312 as shown in FIG. 3 can be utilized to carry scheduling information associated with the narrowband carriers 312, 314, 316. For instance, the narrowband carrier 312 can be utilized for PSS, SSS, and/or PBCH signaling as described above.

In the event that the wideband carrier 310 is an NR eMBB carrier and/or another non-LTE carrier, a narrowband carrier 312 operating according to LTE eMTC does not share any control signaling with the wideband carrier 310. As a result, eMTC devices, e.g., the BL/CE UEs 22 shown in FIG. 2, may lack information regarding the bandwidth into which they are embedded. This, in turn, would prevent operation of the eMTC devices in any narrowband carriers 314, 316 aside from the narrowband carrier 312 on which the eMTC devices receive eMTC control signaling.

In an aspect, the scheduling component 220 of the network management device 10, by providing additional information to the BL/CE UEs 22 indicative of the bandwidth of the wideband carrier 310, can enable eMTC devices to recognize and use the additional narrowband carriers 314, 316 for eMTC traffic, e.g., via a Physical Downlink Shared Channel (PDSCH) or the like. While bandwidth limitations associated with eMTC can limit a given eMTC device to a single narrowband carrier 312, 314, 316, the additional bandwidth signaling provided by the scheduling component 220 as described herein can facilitate the scheduling of respective eMTC devices on different ones of the narrowband carriers 312, 314, 316, thereby increasing the overall amount of eMTC traffic that can be managed for a given area. More particularly, even though the radio frequency (RF) components of eMTC devices can be limited to a narrowband bandwidth, e.g., of 1.4 MHz, the eMTC devices can retune their RF components and, at different times, receive or transmit data on different narrowband carriers 312, 314, 316. For example, an eMTC device can transmit and/or receive on a first narrowband carrier 312 at a first time instance, then retune to a second narrowband carrier 314 to receive and/or transmit on the second narrowband carrier at a second time instance.

With further reference to diagram 300, the narrowband carriers 312, 314, 316 can be configured to have a common bandwidth, e.g., a bandwidth corresponding to 6 PRBs, corresponding to 1.4 MHz. While the narrowband carriers 312, 314, 316 are shown in FIG. 3 as occupying wholly non-overlapping resources within the wideband carrier 310, it is noted that narrowband carriers could be overlapping or non-overlapping, as well as consecutive or non-consecutive.

It is additionally noted that narrowband carriers can be embedded into any suitable PRBs and/or other divisions of an underlying wideband carrier. For instance, a narrowband carrier embedded into a wideband carrier may, or may not, occupy a set of PRBs of the wideband carrier beginning with a PRB having an index of 0.

Table 1 as provided below relates respective wideband carrier bandwidths that can be used in a 5G NR system to their corresponding PRB counts and the number of narrowband carriers that could be embedded into the corresponding bandwidths by the network coexistence component 210. It is noted, however, that Table 1 is provided merely as a set of non-limiting examples, and that other bandwidths and/or narrowband carrier configurations are also possible.

TABLE 1

Example bandwidth configurations for a wideband carrier.

| Bandwidth (MHz) | 10 | 15 | 20 | 25 | 30 | 40 | 50 |
|---|---|---|---|---|---|---|---|
| PRBs | 52 | 79 | 106 | 133 | 160 | 216 | 270 |
| Narrowbands | 8 | 13 | 17 | 22 | 26 | 36 | 45 |

Figure 4:
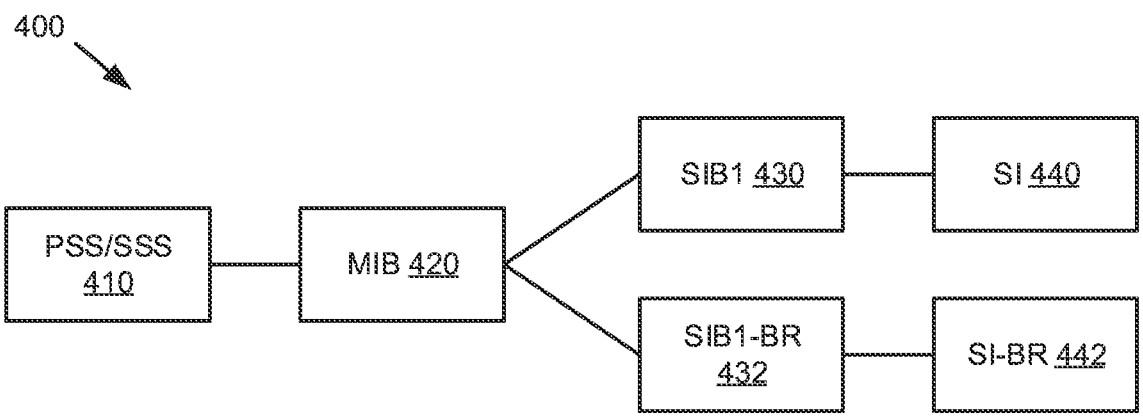
FIGS. 4-5 are diagrams of respective structures that can be utilized to transmit system information within a communication network in accordance with various aspects described herein.
Figure 5:
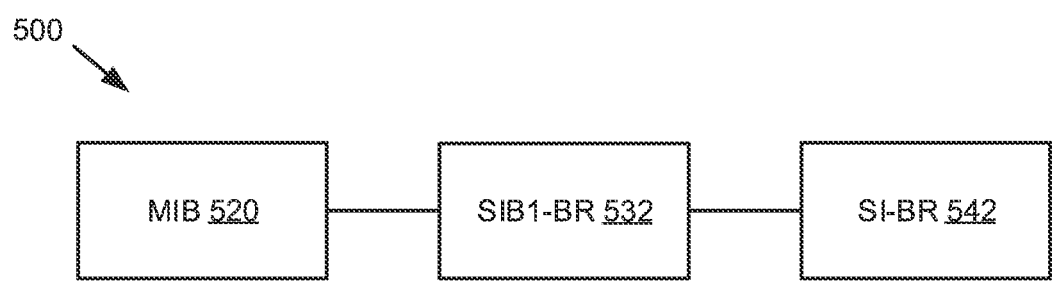

Referring next to FIGS. 4-5, and with further reference to FIG. 2, example structures that can be utilized to transmit system information within a communication network are provided. With reference first to diagram 400 in FIG. 4, a shared system information structure for LTE eMTC and LTE MBB is illustrated that includes a PSS/SSS 410 followed by a MIB 420. In an aspect, the MIB 420 can be carried over a broadcast channel, e.g., PBCH, within a 1.4 MHz carrier band. The MIB 420 can include a limited number of frequently transmitted parameters that are utilized to acquire other information from a given cell.

The MIB 420 can be followed by one or more system information blocks (SIBs), including a SystemInformationBlockType 1 (SIB1) 430 and or more subsequent SystemInformation (SI) messages 440. Unlike the MIB 420, SIB1 430 and SI messages 440 can be transmitted over a full wideband carrier band. To accommodate BL/CE UEs 22 and/or other eMTC devices, eMTC devices can apply bandwidth reduced (BR) versions of SIB and SI messages, e.g., SIB1-BR 432 and SI-BR messages 442 as further shown in FIG. 4. Thus, in an LTE system, MBB and eMTC UEs can utilize a common PSS/SSS 410 and MIB 420, and the system information can subsequently branch off into MBB- and eMTC-specific signaling.

In a non-LTE system, e.g., a NR eMBB system, that does not share common signaling with eMTC, the network management device 10 can instead structure system information as shown by diagram 500 in FIG. 5. Here, the system information structure utilizes a single branch for eMTC-specific signaling, including an MIB 520, a SIB-BR 532, and SI-BR messages 542. An example structure that can be utilized by the scheduling component 220 for MIB 520 is described in further detail below.

In an aspect, MIBs 420, 520 can utilize a fixed schedule, e.g., with a periodicity of 40 ms. Accordingly, repetitions of MIBs 420, 520 can be made within the 40 ms scheduled in subframe #0 of respective radio frames. Additionally, transmission of MIBs 420, 520 in a time division duplexing (TDD) or frequency division duplexing (FDD) system with a bandwidth larger than 1.4 MHz can additionally be repeated for BL/CE UEs 22 in subframe #0 of the same radio frame, and/or in subframe #9 of the previous radio frame for FDD and subframe #5 of the same radio frame for TDD. These optional MIB repetitions can be omitted in the case of a standalone eMTC carrier.

As noted above, separate BR versions of SIB1 further SI messages, e.g., SIB1-BR 432, 532 and SI-BR messages 442, 542, can be used for eMTC and scheduled independently. For instance, SIB1-BR 432, 532 can use a schedule with a periodicity of 80 ms, and repetitions made within 80 ms can be indicated via MIB 420, 520. Further, the detailed time/frequency domain scheduling information for the SI messages can be provided in SIB1-BR 432, 532. Additionally, the resource allocation for PDSCH carrying SIB1-BR 432, 532 and SI-BR messages 442, 542 can be a set of six resource blocks within a narrowband.

Returning to FIG. 2, the network management device 10 can indicate the bandwidth of an associated wideband carrier via values contained within respective fields of a MIB. By way of example, a MIB structure that can be utilized for eMTC operating within an LTE MBB system is shown by Table 2 below.

TABLE 2

Example MIB structure for LTE eMTC/MBB.

| MasterInformationBlock ::= | SEQUENCE { |
|---|---|
| dl-Bandwidth | ENUMERATED { |
| | n6, n15, n25, n50, n75, n100}, |
| phich-Config | PHICH-Config, |
| schedulingInfoSIB1-BR-r13 | BIT STRING (SIZE (8)), |
| systemInfoUnchanged-BR-r15 | BOOLEAN, |
| spare | BIT STRING (SIZE (4)) |
| } | |

In Table 2 above, the dl-Bandwidth field indicates the width of an LTE MBB carrier into which LTE eMTC carriers are embedded, and the enumerated values of the dl-Bandwidth field correspond to respective numbers of resource blocks, e.g., 6, 15, 25, 50, 75, or 100 PRBs. However, in the case of an LTE eMTC carrier embedded into a non-LTE wideband carrier, the dl-Bandwidth field shown in Table 2 is fixed to the value n6, e.g., the width of the carrier band on which the MIB is transmitted, in order to prevent legacy LTE UEs from being configured with incorrect LTE bandwidth information. Accordingly, the MIB structure shown in Table 2 can be modified such that some or all of the spare bits in the MIB can be used to signal the bandwidth of the wideband carrier into which the LTE eMTC carrier is embedded. An example of a MIB structure that can be modified in this way for a 5G NR network is shown below in Table 3, where new field dl-BandwidthNR is used to signal the 5G NR bandwidth.

TABLE 3

Example MIB structure for LTE eMTC/NR eMBB.

| MasterInformationBlock ::= | SEQUENCE { |
|---|---|
| dl-Bandwidth | ENUMERATED {n6}, |
| phich-Config | PHICH-Config, |
| schedulingInfoSIB1-BR-r13 | BIT STRING (SIZE (8)), |
| systemInfoUnchanged-BR-r15 | BOOLEAN, |
| dl-BandwidthNR | ENUMERATED { |
| | n6, n15, n25, n50, n75, n100} |
| } | |

While the dl-BandwidthNR field in the example shown in Table 3 utilizes the same enumerated values as the dl-Bandwidth field shown in Table 2, it is noted that other enumerated values could also be used. In some cases, the dl-BandwidthNR field shown in Table 3 can be utilized to inform an eMTC UE of the 5G NR carrier bandwidth it is embedded into up to a maximum bandwidth, e.g., the LTE 20 MHz legacy bandwidth). This can be done, e.g., to avoid scheduling an LTE eMTC device on frequency resources that fall outside the LTE spectrum and are not configured by the LTE eMTC device for use. Accordingly, in the event that the bandwidth of the wideband carrier into which an eMTC carrier is embedded exceeds 20 MHz, or another threshold bandwidth, the MIB can indicate the threshold bandwidth in the additional bandwidth field instead of the actual bandwidth of the wideband carrier. As a result of the MIB structure shown in Table 3, an eMTC UE can operate as if it was embedded into a wideband MBB carrier, even in cases where an LTE MBB carrier is absent and the eMTC carrier is embedded into another carrier, such as a wideband 5G NR eMBB carrier. Because the original field, e.g., dl-Bandwidth, is set to a legacy value, e.g., n6, an extended MIB as shown in Table 3 can be utilized by eMTC and/or MBB legacy devices. Accordingly, the extended MIB as shown in Table 3 can be backward compatible with legacy equipment.

In an aspect, the narrowbands on which system information messages subsequent to the MIB, e.g., SIB1-BR and/or additional SI-BR messages are transmitted, can be derived from the wideband carrier as given by dl-BandwidthNR in Table 3. Additionally, except for SIB-BR, the narrowbands can also be configurable, e.g., via SIB1-BR, other SI messages, dedicated radio resource control (RRC) signaling, or the like.

Figure 6:
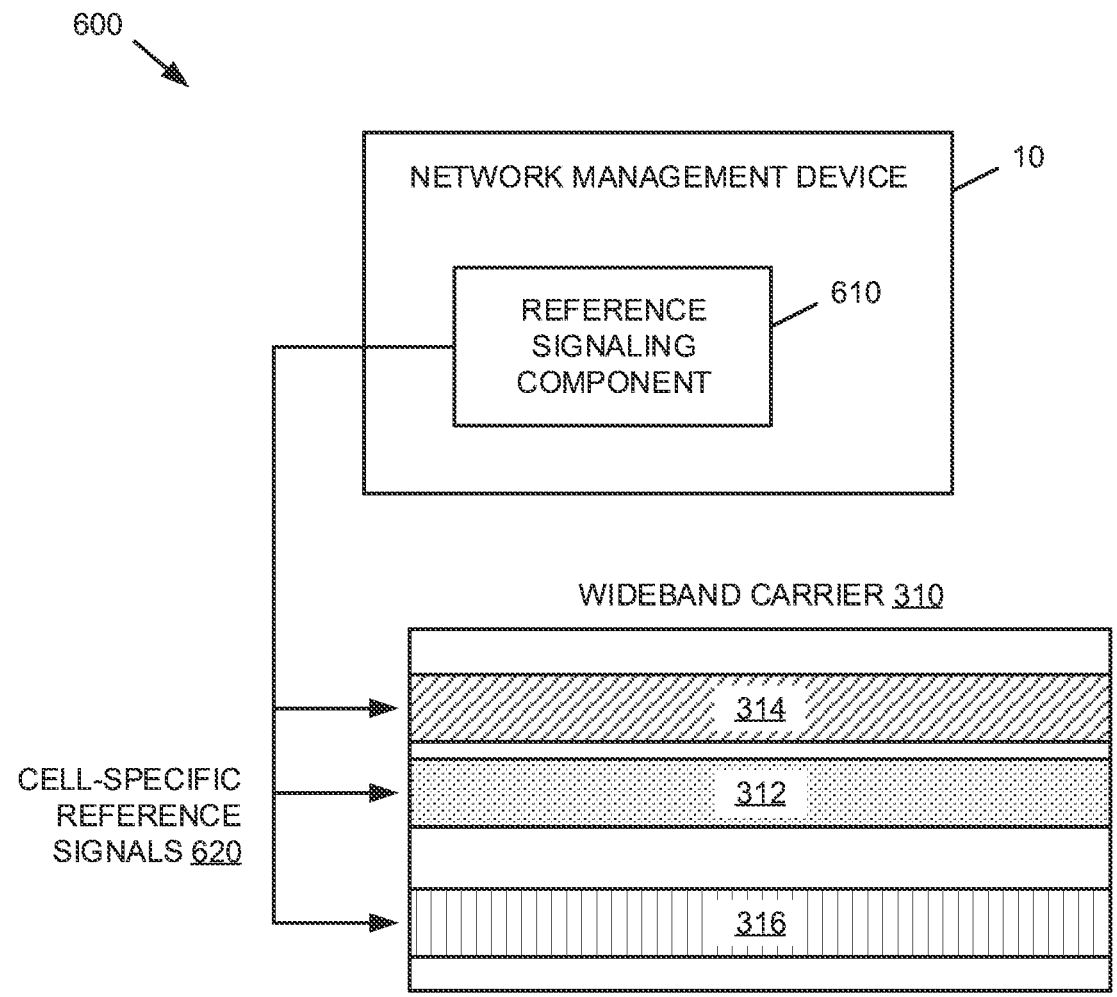
FIG. 6 is a block diagram of a system that facilitates selective transmission of cell-specific reference signals in accordance with various aspects described herein.

Turning now to FIG. 6, a block diagram of a system 600 that facilitates selective transmission of cell-specific reference signals (CRS) is illustrated. Repetitive description of like elements employed in other embodiments described herein is omitted for sake of brevity. As shown in FIG. 6, the network management device 10 of system 600 can include a reference signaling component 610 that can send control signaling, such as LTE cell-specific reference signals (CRS) 620, in a selective manner such that LTE CRS 620 are sent only in the PRBs of a wideband carrier 310 that can carry eMTC, e.g., the narrowband carriers 312, 314, 316 as described above with respect to FIG. 3. Stated another way, the reference signaling component 610 can transmit LTE CRS 620 according to a transmit procedure that transmits LTE CRS 620 in first PRBs associated with narrowband carriers 312, 314, 316, while refraining from and/or otherwise preventing transmission of CRS 620 in PRBs associated with the wideband carrier 310 into which narrowband carriers 312, 314, 316 are not embedded.

In an aspect, selective transmission of LTE CRS 620 as shown by FIG. 6 can be performed by the reference signaling component 610 for LTE eMTC carriers embedded into a non-LTE wideband carrier 310, such as a NR eMBB carrier. By avoiding transmission of LTE CRS 620 on respective PRBs of the wideband carrier 310 that are not configured for potential LTE transmissions, the reference signaling component 610 can facilitate increased efficiency of non-eMTC devices, e.g., 5G NR devices, utilizing the wideband carrier 310.

Figure 7:
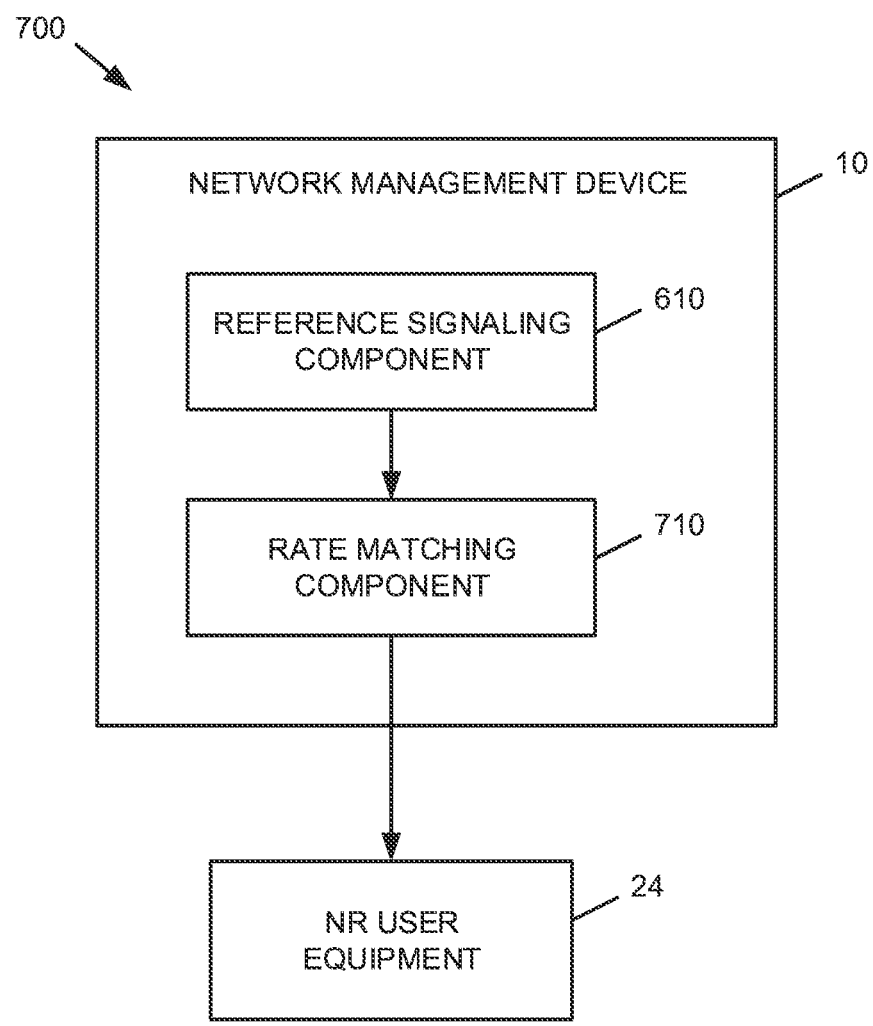
FIGS. 7-8 are block diagrams of respective systems that facilitate communication of rate matching information associated with selective transmission of cell-specific reference signals in accordance with various aspects described herein.

Referring next to FIG. 7, a block diagram of a system 700 that facilitates communication of rate matching information associated with selective CRS transmission, e.g., CRS transmission as shown in FIG. 6, is illustrated. Repetitive description of like elements employed in other embodiments described herein is omitted for sake of brevity.

Referring next to FIG. 7, a block diagram of a system 700 that facilitates communication of rate matching information associated with selective CRS transmission, e.g., CRS transmission as shown in FIG. 6, is illustrated. Repetitive description of like elements employed in other embodiments described herein is omitted for sake of brevity. As noted above with respect to FIG. 6, the reference signaling component of the network management device 10 of system 700 can selectively transmit LTE CRS on bands designated for eMTC communication within another system, such as a 5G NR system, for the benefit of BL/CE UEs and/or other devices engaging in the eMTC communication.

As further shown by system 700, the network management device 10 can additionally include a rate matching component 710 that can transmit rate matching information, e.g., information indicative of the PRBs and/or other resources on which LTE CRS are transmitted, to non-LTE devices, such as NR UEs 24, to enable the non-LTE devices to rate match around the LTE CRS. In an aspect, the NR UEs 24 can rate match around OFDM tones and/or other resources associated with LTE CRS via dynamic spectrum sharing (DSS) and/or otherwise avoiding the resources on which the LTE CRS are sent based on the rate matching information provided by the rate matching component 710.

In an aspect, the rate matching component 710 can transmit rate matching information to NR UEs 24 via an RRC Information Element (IE), and/or by other suitable means. In one implementation, the rate matching component 710 can define a new RRC IE for the above described rate matching information. Alternatively, an existing RRC IE, such as the RateMatchPatternLTE-CRS IE can be reused, and the PRBs and/or other resource elements containing LTE CRS for eMTC can be derived from the information in the reused IE. Other implementations are also possible.

Figure 8:
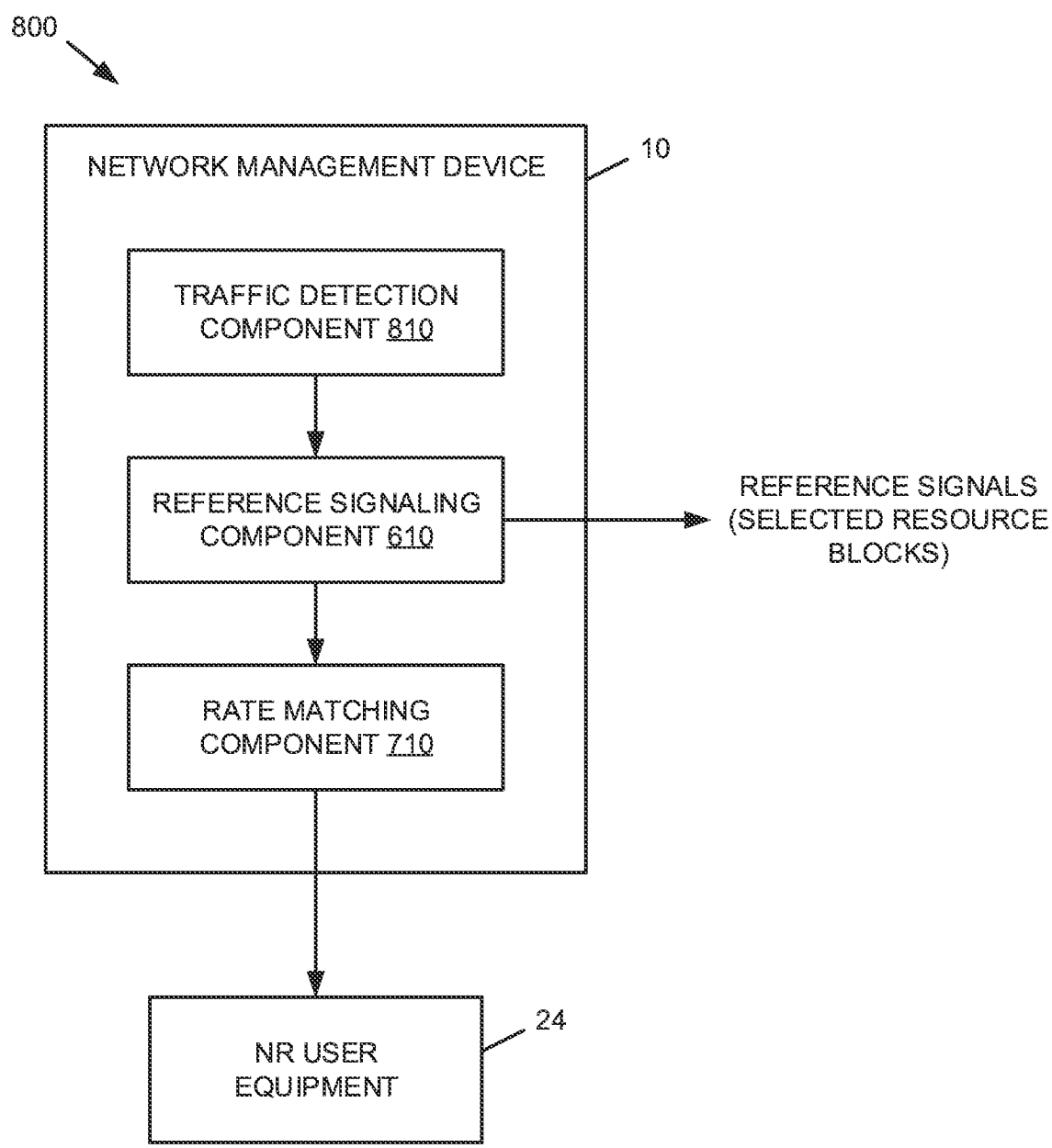

Turning now to FIG. 8, a block diagram of a system 800 that facilitates dynamic CRS transmission and rate matching is illustrated. Repetitive description of like elements employed in other embodiments described herein is omitted for sake of brevity. As shown in FIG. 8, the network management device 10 of system 800 can include a traffic detection component 810 that can identify the presence of eMTC-related network traffic on respective narrowbands allocated within a wideband carrier for eMTC transmission, e.g., the narrowband carriers 312, 314, 316 shown in FIG. 3. Based on the presence or absence of eMTC traffic on respective narrowband carriers, the reference signaling component 610 of system 800 can selectively transmit LTE CRS, e.g., by transmitting LTE CRS on a given narrowband carrier in response to the presence of eMTC traffic on that carrier. Conversely, the reference signaling component 610 of system 800, in response to the traffic detection component 810 not detecting eMTC traffic on a given narrowband carrier, can forego LTE CRS transmission on that carrier, e.g., pending the reappearance of eMTC traffic on that carrier.

As additionally shown in FIG. 8, the rate matching component 710 of system 800 can tailor rate matching information to NR UEs 24 based on the PRBs of an underlying wideband carrier on which LTE CRS are being transmitted by the reference signaling component 610. For instance, the rate matching component 710 can dynamically indicate to an NR UE 24, via downlink control information (DCI) carried on a Physical Downlink Control Channel (PDCCH) or other suitable control channel, whether or not to rate match a given NR transmission. An indication as provided by the rate matching component 710 in this manner can provide rate matching information at the PRB level and/or any other suitable sub-band level, e.g., by means of a bitmap in the DCI and/or by other means.

In an aspect, the rate matching component 710 can define a new RRC IE that configures the DCI as described above such that the PDCCH can dynamically indicate the PRBs that contain CRS for a downlink NR PDSCH. Alternatively, information corresponding to an existing RRC IE could be reused, e.g., as described above with respect to FIG. 7. In either of these implementations, the rate matching component 710 can enable NR UEs 24 to obtain information from the provided RRC IE(s) irrespective of whether the PRBs carry LTE CRS to be rate matched.

Figure 9:
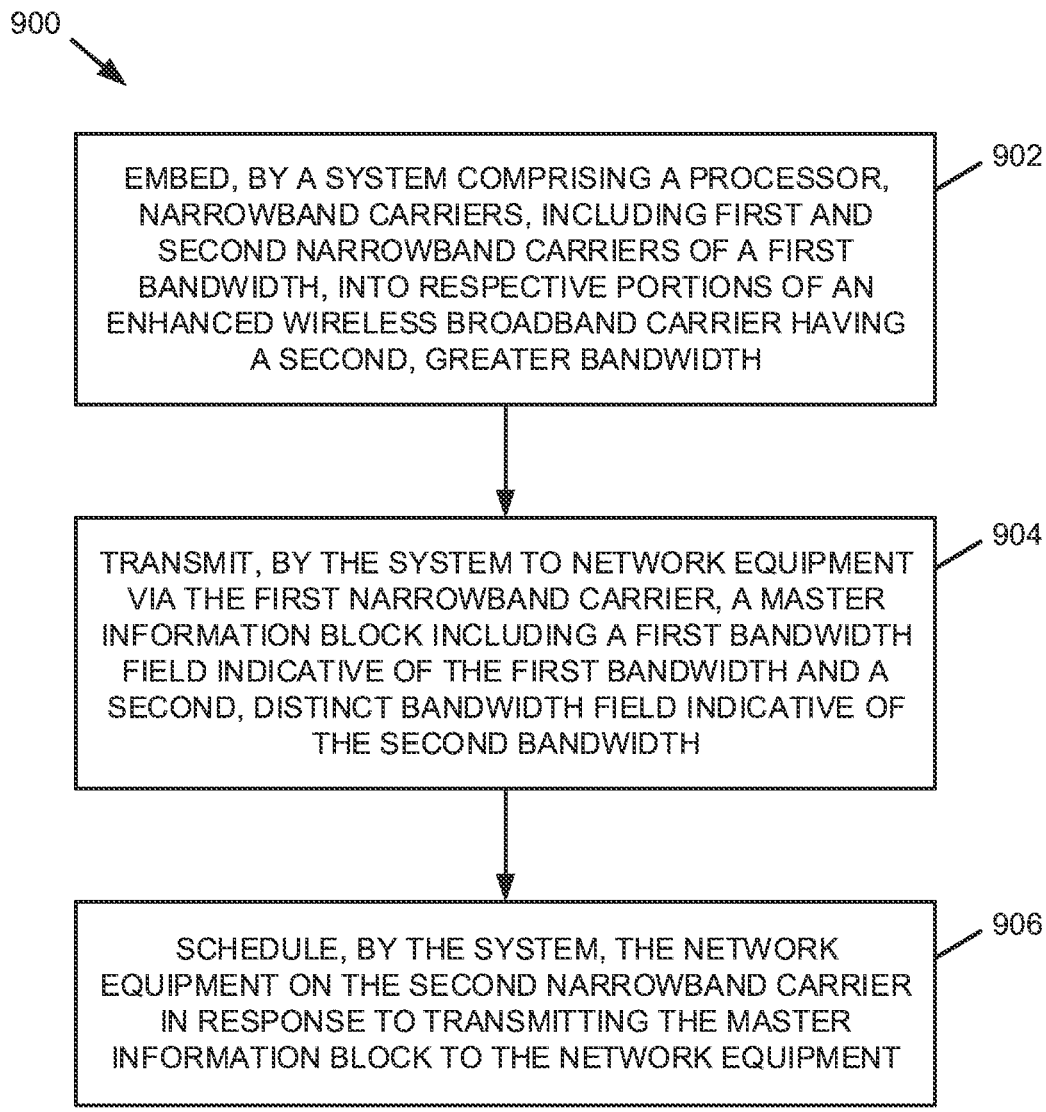
FIGS. 9-10 are flow diagrams of respective methods that facilitate mobile broadband and machine type communication network coexistence in accordance with various aspects described herein.
Figure 10:
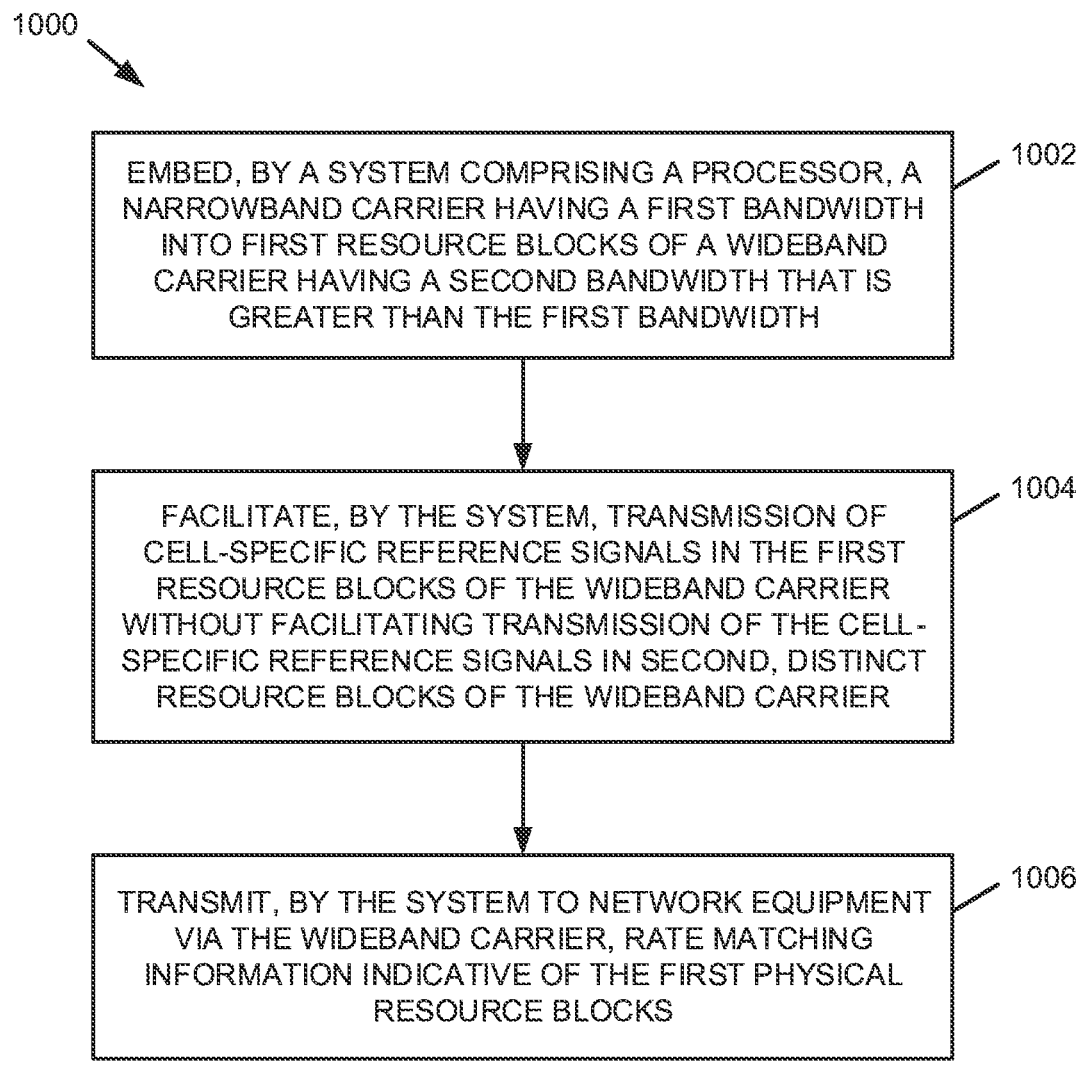

FIGS. 9-10 illustrate methods in accordance with certain aspects of this disclosure. While, for purposes of simplicity of explanation, the methods are shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 9, a flow diagram of a method 900 that facilitates MBB and MTC network coexistence is presented. At 902, a system comprising a processor (e.g., a network management device 10 comprising a processor 14, and/or a system including such a device) can embed (e.g., by a network coexistence component 210 and/or other components implemented by the processor 14) narrowband carriers, including a first narrowband carrier and a second narrowband carrier each having a first bandwidth, into respective portions of an eMTC carrier having a second bandwidth that is greater than the first bandwidth.

At 904, the system can transmit (e.g., by a scheduling component 220 and/or other components implemented by the processor 14), to network equipment (e.g., BL/CE UEs 22) via the first narrowband carrier embedded at 902, a MIB that includes a first bandwidth field indicative of the first bandwidth (e.g., the bandwidth of the narrowband carriers) and a second, distinct bandwidth field indicative of the second bandwidth (e.g., the bandwidth of the eMTC carrier).

At 906, in response to transmitting the MIB to the network equipment at 904, the system can schedule (e.g., by the scheduling component 220 and/or other components implemented by the processor 14) the network equipment to which the MIB was transmitted at 904 on the second narrowband carrier embedded at 902.

Referring next to FIG. 10, a flow diagram of another method 1000 that facilitates MBB and MTC network coexistence is presented. At 1002, a system comprising a processor (e.g., a network management device 10 comprising a processor 14, and/or a system including such a device) can embed (e.g., by a network coexistence component 210 and/or other components implemented by the processor 14) a narrowband carrier having a first bandwidth into first resource blocks of a wideband carrier having a second bandwidth that is greater than the first bandwidth.

At 1004, the system can facilitate (e.g., by a reference signaling component 610 and/or other components implemented by the processor 14) transmission of cell-specific reference signals in the first resource blocks of the wideband carrier, e.g., the resource blocks into which the narrowband carrier was embedded at 1002, without facilitating transmission of the cell-specific reference signals in second resource blocks of the wideband carrier, e.g., resource blocks of the wideband carrier into which no narrowband carriers are embedded).

At 1006, the system can transmit (e.g., by a rate matching component 710 and/or other components implemented by the processor 14), to network equipment (e.g., an NR UE 24) via the wideband carrier, rate matching information indicative of the first resource blocks into which the narrowband carrier was embedded at 1002.

Figure 11:
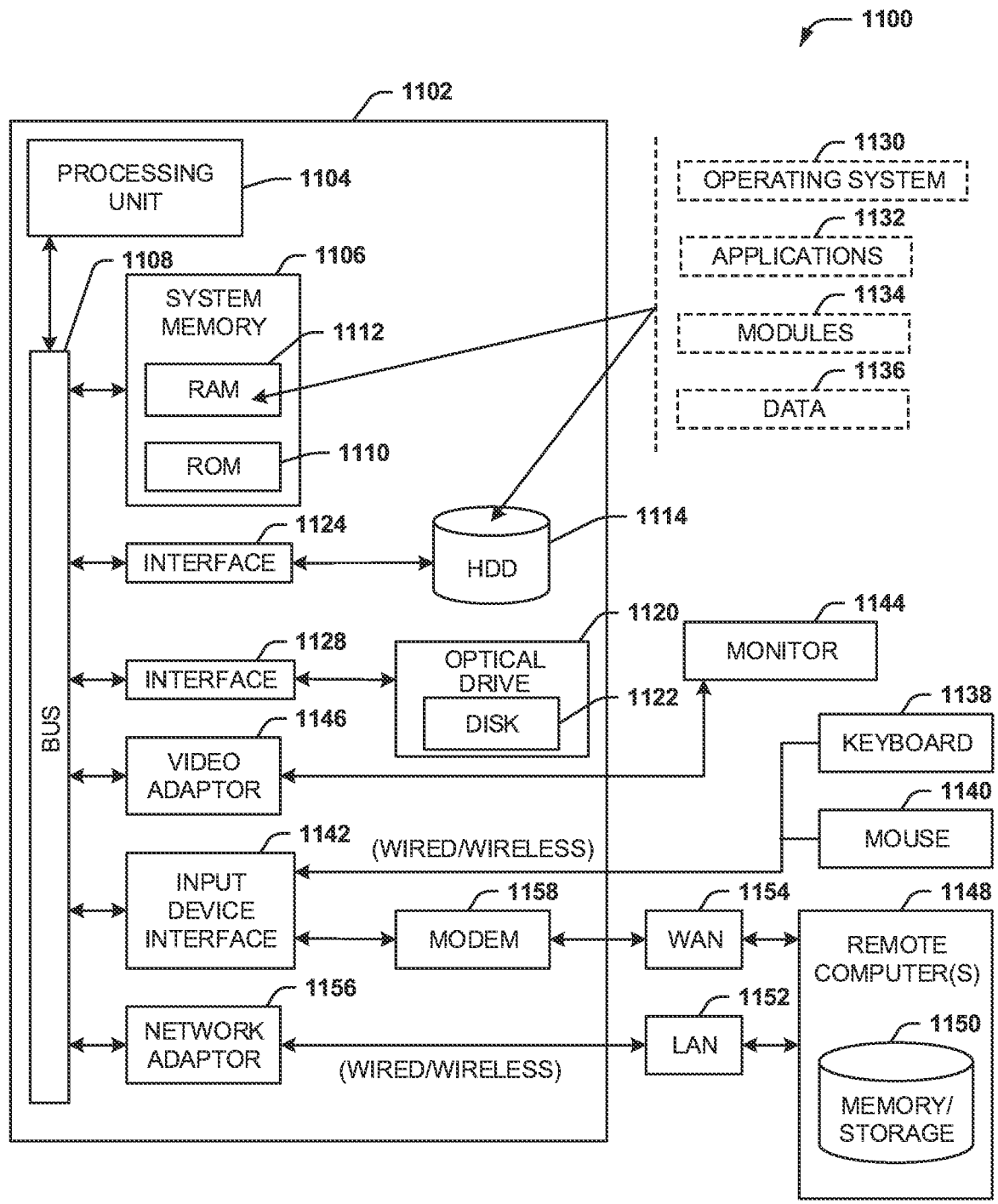
FIG. 11 depicts an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 and an optical disk drive 1120, (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114 and optical disk drive 1120 can be connected to the system bus 1108 by an HDD interface 1124 and an optical drive interface 1128, respectively. The HDD interface 1124 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a USB port, an IR interface, a BLUETOOTH® interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    embedding, by a system comprising a processor, narrowband carriers, comprising a first narrowband carrier having a first bandwidth and a second narrowband carrier having the first bandwidth, into respective portions of an enhanced wireless broadband carrier, the enhanced wireless broadband carrier having a second bandwidth that is greater than the first bandwidth;
    transmitting, by the system to network equipment via the first narrowband carrier, a master information block comprising a first bandwidth field indicative of the first bandwidth and a second bandwidth field, distinct from the first bandwidth field, indicative of the second bandwidth, wherein the transmitting comprises:
        in response to the second bandwidth exceeding a threshold bandwidth, populating the second bandwidth field of the master information block with the threshold bandwidth instead of the second bandwidth; and
    scheduling, by the system, the network equipment on the second narrowband carrier in response to transmitting the master information block to the network equipment.

2. The method of claim 1, wherein the enhanced wireless broadband carrier comprises physical resource blocks, and wherein the embedding the narrowband carriers comprises embedding the narrowband carriers into first physical resource blocks of the physical resource blocks.

3. The method of claim 2, further comprising:
    transmitting, by the system, cell-specific reference signals in the first physical resource blocks; and
    refraining, by the system, from transmitting the cell-specific reference signals in second physical resource blocks, of the physical resource blocks and distinct from the first physical resource blocks, into which the narrowband carriers are not embedded.

4. The method of claim 3, wherein the network equipment is first network equipment, and wherein the method further comprises:
    transmitting, by the system to second network equipment that is distinct from the first network equipment, rate matching information indicative of the first physical resource blocks.

5. The method of claim 4, wherein the transmitting the rate matching information comprises transmitting the rate matching information via a radio resource control information element.

6. The method of claim 2, further comprising:
transmitting, by the system, cell-specific reference signals in the first physical resource blocks in response to a presence of network traffic associated with the network equipment on the first physical resource blocks.

7. The method of claim 6, wherein the network equipment is first network equipment, and wherein the method further comprises:
transmitting, by the system to second network equipment that is distinct from the first network equipment, rate matching information indicative of the first physical resource blocks via a downlink control channel.

8. The method of claim 1, wherein the narrowband carriers are associated with an enhanced machine type communication network.

9. A system, comprising:
a processor; and
a memory that stores executable instructions that, when executed by the processor, facilitate performance of operations, the operations comprising:
embedding narrowband carriers, comprising a first narrowband carrier and a second narrowband carrier, of a first bandwidth into respective portions of an enhanced wireless broadband carrier, the enhanced wireless broadband carrier having a second bandwidth that is greater than the first bandwidth;
transmitting, to user equipment via the first narrowband carrier, a master information block comprising a first bandwidth field indicative of the first bandwidth and a second bandwidth field, distinct from the first bandwidth field, indicative of the second bandwidth, wherein the transmitting comprises:
in response to the second bandwidth exceeding a threshold bandwidth, populating the second bandwidth field of the master information block with the threshold bandwidth instead of the second bandwidth; and
allocating communication resources associated with the second narrowband carrier to the user equipment in response to transmitting the master information block to the user equipment.

10. The system of claim 9, wherein the enhanced wireless broadband carrier comprises a group of physical resource blocks, and wherein the embedding the narrowband carriers comprises embedding the narrowband carriers into first physical resource blocks of the group of physical resource blocks.

11. The system of claim 10, wherein the operations further comprise:
transmitting cell-specific reference signals according to a transmit procedure that:
transmits the cell-specific reference signals via the first physical resource blocks; and
does not transmit the cell-specific reference signals in second physical resource blocks of the group of physical resource blocks that are distinct from the first physical resource blocks.

12. The system of claim 11, wherein the user equipment is first user equipment, and wherein the operations further comprise:
transmitting, to second user equipment that is distinct from the first user equipment, rate matching information indicative of the first physical resource blocks.

13. The system of claim 11, wherein the cell-specific reference signals are transmitted via the first physical resource blocks in response to a presence of network traffic initiated by the user equipment and associated with the first physical resource blocks.

14. The system of claim 13, wherein the user equipment is first user equipment, and wherein the operations further comprise:
transmitting, to second user equipment that is distinct from the first user equipment via a downlink control channel, rate matching information indicative of the first physical resource blocks.

15. The system of claim 9, wherein the narrowband carriers are associated with an enhanced machine type communication network.

16. A non-transitory machine-readable medium, comprising executable instructions that, when executed by a processor, facilitate performance of operations, the operations comprising:
embedding a group of carrier bands, comprising a first carrier band and a second carrier band, having a first bandwidth into respective portions of an enhanced wireless broadband carrier band, the enhanced wireless broadband carrier band having a second bandwidth that is greater than the first bandwidth;
transmitting, to a network device via the first carrier band, a master information block comprising a first bandwidth field that indicates the first bandwidth and a second bandwidth field, distinct from the first bandwidth field, that indicates the second bandwidth, wherein the transmitting comprises:
in response to the second bandwidth exceeding a threshold bandwidth, populating the second bandwidth field of the master information block with the threshold bandwidth instead of the second bandwidth; and
scheduling communication resources associated with the second carrier band to the network device in response to transmitting the master information block to the network device.

17. The non-transitory machine-readable medium of claim 16, wherein the enhanced wireless broadband carrier band comprises physical resource blocks, and wherein the embedding the group of carrier bands comprises embedding the group of carrier bands into first physical resource blocks of the physical resource blocks.

18. The non-transitory machine-readable medium of claim 17, wherein the operations further comprise:
transmitting cell-specific reference signals in the first physical resource blocks; and
preventing any transmission of the cell-specific reference signals in second physical resource blocks, of the physical resource blocks, that are distinct from the first physical resource blocks.

19. The non-transitory machine-readable medium of claim 18, wherein the transmitting of the cell-specific reference signals in the first physical resource blocks comprises:
transmitting the cell-specific reference signals in response to a presence of network traffic initiated by the network device and associated with the first physical resource blocks.

20. The non-transitory machine-readable medium of claim 17, wherein the network device is a first network device, and wherein the operations further comprise:
transmitting, to a second network device that is distinct from the first network device, rate matching information indicative of the first physical resource blocks.

* * * * *